(12) United States Patent
Hu et al.

(10) Patent No.: US 12,099,390 B2
(45) Date of Patent: Sep. 24, 2024

(54) FREQUENCY CONTROL METHOD AND APPARATUS

(71) Applicant: HUAWEI TECHNOLOGIES CO., LTD., Guangdong (CN)

(72) Inventors: Di Hu, Beijing (CN); Dongzhi Guo, Dongguan (CN); Dmytro Kutra, Kyiv (UA); Zhen Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 45 days.

(21) Appl. No.: 18/171,825

(22) Filed: Feb. 21, 2023

(65) Prior Publication Data

US 2023/0205286 A1    Jun. 29, 2023

Related U.S. Application Data

(63) Continuation of application No. PCT/CN2020/110602, filed on Aug. 21, 2020.

(51) Int. Cl.
*G06F 1/20* (2006.01)
*G06F 1/324* (2019.01)
*G06F 11/30* (2006.01)
*G06F 15/78* (2006.01)

(52) U.S. Cl.
CPC .......... *G06F 1/206* (2013.01); *G06F 15/7871* (2013.01); *G06F 1/324* (2013.01); *G06F 11/30* (2013.01); *Y02D 10/00* (2018.01)

(58) Field of Classification Search
CPC .......... G06F 1/206; G06F 1/324; G06F 11/30; G06F 15/7871; Y02D 10/00
See application file for complete search history.

(56) References Cited

U.S. PATENT DOCUMENTS

| | | | | |
|---|---|---|---|---|
| 7,467,318 | B2 * | 12/2008 | Bruno | G06F 1/206 |
| | | | | 713/322 |
| 9,075,611 | B2 * | 7/2015 | Tan | G06F 1/324 |
| 10,281,964 | B2 * | 5/2019 | Hankendi | G06F 11/3058 |
| 2015/0106642 | A1 * | 4/2015 | Naffziger | G06F 1/324 |
| | | | | 713/340 |
| 2015/0143139 | A1 * | 5/2015 | Kumar | G06F 9/3016 |
| | | | | 713/300 |

* cited by examiner

*Primary Examiner* — Terrell S Johnson
(74) *Attorney, Agent, or Firm* — Fish & Richardson P.C.

(57) ABSTRACT

This application discloses example frequency control methods, frequency controllers, processors, and electronic devices. One example method includes obtaining at least two temperatures of a processor core, where each of the at least two temperatures corresponds to a frequency. A load change mode of the processor core is determined, where the load change mode indicates a change status of a load of the processor core. A target temperature is determined from the at least two temperatures of the processor core based on the load change mode. A frequency of the processor core is adjusted based on the target temperature.

20 Claims, 8 Drawing Sheets

FREQUENCY CONTROL METHOD AND APPARATUS

CROSS-REFERENCE TO RELATED APPLICATIONS

This application is a continuation of International Application No. PCT/CN 2020/110602, filed on Aug. 21, 2020, the disclosure of which is hereby incorporated by reference in its entirety.

TECHNICAL FIELD

This application relates to the field of processor technologies, and in particular, to a frequency control method and an apparatus.

BACKGROUND

When an electronic device is delivered from a factory, standard operating ranges, such as a rated operating frequency and a rated operating voltage, are usually defined for an element (such as a processor core) in the electronic device. In a normal case, the processor core performs processing based on the rated operating frequency. However, if the processor core has a turbo function, the processor core can increase its frequency to above the rated operating frequency when determining that the rated operating frequency does not meet the requirement of a current operating scenario. This improves processing performance of the processor core.

In a solution of a conventional technology, if a user enables the turbo function of the electronic device, the electronic device may probably run at a preset turbo frequency. However, in this case, the processor core may be kept in a high-voltage high-frequency state for a long time. As a result, a temperature of the processor core may be excessively high.

SUMMARY

This application provides a frequency control method and an apparatus, to resolve a technical issue that a processor core is kept in a high-voltage high-frequency state for a long time during turbo boosting.

According to a first aspect, this application provides a frequency control method applicable to a frequency controller. The method includes: The frequency controller obtains at least two temperatures of the processor core, determines a load change mode of the processor core, determines a target temperature from the at least two temperatures based on the load change mode; and adjusts a frequency of the processor core based on the target temperature. Each of the at least two temperatures corresponds to a frequency, and the load change mode is used to indicate a change status of a load of the processor core.

In the forgoing design, the frequency controller controls the frequency of the processor core in real time based on the at least two temperatures of the processor core. In this way, a temperature of the processor core after frequency adjustment can be always within a proper temperature range. This helps prevent the processor core from being kept in a high-voltage high-frequency state for a long time. Further, in this method, the target temperature suitable for a current load change mode is further selected from the at least two temperatures of the processor core to perform frequency adjustment. Therefore, a frequency, obtained after adjustment, of the processor core can better conform to current load change characteristics of the processor core. In this way, the frequency of the processor core can be adjusted more timely.

In a possible design, that the frequency controller obtains at least two temperatures of the processor core includes: The frequency controller first obtains a temperature of the processor core at a first moment, and then predicts a temperature of the processor core at a second moment based on the temperature of the processor core at the first moment. The second moment is later than the first moment. In this design, if the temperature at the first moment is a current temperature, the frequency controller can select the target temperature from the current temperature and a future temperature. The current temperature is affected by a historical load, and the future temperature is affected by a current load. Therefore, the frequency, determined in this design, of the processor core can better conform to a characteristic of a load that has greater impact on the processor core in the historical load and the current load.

In a possible design, the target temperature may meet any one of the following conditions:

Condition 1: If the load change mode of the processor core is a load constant mode, the frequency controller may use, as the target temperature, a temperature corresponding to a highest frequency in a frequency corresponding to the temperature at the first moment and a frequency corresponding to the temperature at the second moment. If a load change is relatively small, the processor core is actually in a stable state. In this case, a temperature, obtained after frequency adjustment, of the processor core does not exceed a temperature threshold range, regardless of whether the frequency of the processor core is adjusted based on the current temperature of the processor core or based on the future temperature of the processor core. On this basis, in this design, the frequency of the processor core is adjusted to a higher frequency in the frequency corresponding to the future temperature and the frequency corresponding to the current temperature. This enables the processor core to run at a higher frequency when the temperature of the processor core does not exceed the temperature threshold range, so as to maximize a processing capability of the processor core and fully utilize a thermal margin.

Condition 2: If the load change mode of the processor core is a load increase mode, the frequency controller may use the temperature at the first moment as the target temperature. When the current load is in an increase state, the future load corresponds to a higher temperature. However, there is actually no need to perform frequency reduction because the current temperature does not increase to the future temperature. In this case, the frequency of the processor core is adjusted based on a frequency corresponding to the current temperature. This can fully utilize the thermal margin of the processor core, and helps maximize processing performance of the processor core when the temperature of the processor core is controllable.

Condition 3: If the load change mode of the processor core is a load decrease mode, the frequency controller may use the temperature at the second moment as the target temperature. When the current load is in a decrease state, the current load corresponds to a relatively high temperature, and the future load corresponds to a relatively low temperature. In this case, a frequency increasing operation can be performed on the processor core in advance based on the future temperature. This helps improve the processing performance of the processor core rapidly.

In a possible design, the frequency controller may determine the load change mode of the processor core in any one of the following manners:

Manner 1: The frequency controller first determines a first load change range based on a load of the processor core at a historical moment before the first moment and a preset load change amount. If a load of the processor core at the first moment falls within the first load change range, the frequency controller determines that the load change mode of the processor core is the load constant mode. If a load of the processor core at the first moment is larger than a maximum load in the first load change range, the frequency controller determines that the load change mode of the processor core is the load increase mode. If a load of the processor core at the first moment is smaller than a minimum load in the first load change range, the frequency controller determines that the load change mode of the processor core is the load decrease mode. The load change mode in a historical time period is determined based on the historical load and the current load. In this way, the determined load change mode can reflect a load change status after the current moment, and real-time performance of the load change mode is relatively good.

Manner 2: The frequency controller first determines a second load change range based on a load of the processor core at the first moment and a preset load change amount, and then predicts a load of the processor core at the second moment based on the load of the processor core at the first moment and a load of the processor core at a historical moment before the first moment. If the load of the processor core at the second moment falls within the second load change range, the frequency controller determines that the load change mode of the processor core is the load constant mode. If the load of the processor core at the second moment is larger than a maximum load in the second load change range, the frequency controller determines that the load change mode of the processor core is the load increase mode. If the load of the processor core at the second moment is smaller than a minimum load in the second load change range, the frequency controller determines that the load change mode of the processor core is the load decrease mode. The load change mode in a future time period is determined based on the current load and the future load. In this way, the determined load change mode can reflect a load change status at the future moment. The load change mode has a characteristic of foresightedness and can better reflect the temperature at the future moment.

In a possible design, that the frequency controller predicts a temperature of the processor core at a second moment based on the temperature of the processor core at the first moment includes: The frequency controller predicts the temperature of the processor core at the second moment based on power of the processor core at the first moment and the temperature of the processor core at the first moment. In this design, the frequency controller can comprehensively consider current power and the current temperature when predicting the future temperature. The current power can reflect a load status of the processor core. Therefore, the future temperature determined in this design can better conform to current load characteristic of the processor core.

In another possible design, that the frequency controller predicts a temperature of the processor core at a second moment based on the temperature of the processor core at the first moment includes: The frequency controller predicts the temperature of the processor core at the second moment based on the temperature of the processor core at the first moment and a temperature of the processor core at the historical moment before the first moment. In this design, the frequency controller can predict the future temperature based on the current temperature and the historical temperature. Temperature changes are continuous. Therefore, the future temperature determined in this design can better conform to an actual characteristic of a temperature change.

According to a second aspect, this application provides a frequency controller. The frequency controller may include a monitoring circuit and a processing circuit.

The monitoring circuit is configured to obtain at least two temperatures of a processor core and send the at least two temperatures to the processing circuit, where each of the at least two temperatures corresponds to a frequency.

The processing circuit is configured to determine a load change mode of the processor core, determine a target temperature from the at least two temperatures based on the load change mode, and adjust a frequency of the processor core based on the target temperature, where the load change mode is used to indicate a change status of a load of the processor core.

In a possible design, the monitoring circuit may obtain a temperature of the processor core at a first moment, and then predict a temperature of the processor core at a second moment based on the temperature of the processor core at the first moment. The second moment is later than the first moment.

In a possible design, after the load change mode of the processor core is determined and if the load change mode of the processor core is a load constant mode, the processing circuit may use, as the target temperature, a temperature corresponding to a highest frequency in a frequency corresponding to the temperature at the first moment and a frequency corresponding to the temperature at the second moment. If the load change mode of the processor core is a load increase mode, the processing circuit may use the temperature at the first moment as the target temperature. If the load change mode of the processor core is a load decrease mode, the processing circuit may use the temperature at the second moment as the target temperature.

In a possible design, the processing circuit may determine the load change mode of the processor core in any one of the following manners:

Manner 1: The processing circuit determines a first load change range based on a load of the processor core at a historical moment before the first moment and a preset load change amount. If a load of the processor core at the first moment falls within the first load change range, the processing circuit determines that the load change mode of the processor core is the load constant mode. If a load of the processor core at the first moment is larger than a maximum load in the first load change range, the processing circuit determines that the load change mode of the processor core is the load increase mode. If a load of the processor core at the first moment is smaller than a minimum load in the first load change range, the processing circuit determines that the load change mode of the processor core is the load decrease mode.

Manner 2: The processing circuit first determines a second load change range based on a load of the processor core at the first moment and a preset load change amount, and then predicts a load of the processor core at the second moment based on the load of the processor core at the first moment and a load of the processor core at a historical moment before the first moment. If the load of the processor core at the second moment falls within the second load change range, the processing circuit determines that the load change mode of the processor core is the load constant mode. If the load of the processor core at the second moment is larger than a maximum load in the second load change range, the processing circuit determines that the load change mode of the processor core is the load increase mode. If the load of the processor core at the second moment is smaller than a minimum load in the second load change range, the processing circuit determines that the load change mode of the processor core is the load decrease mode.

In a possible design, the monitoring circuit may predict the temperature of the processor core at the second moment in any one of the following manners:

Manner 1: The monitoring circuit predicts the temperature of the processor core at the second moment based on power of the processor core at the first moment and the temperature of the processor core at the first moment.

Manner 2: The monitoring circuit predicts the temperature of the processor core at the second moment based on the temperature of the processor core at the first moment and a temperature of the processor core at the historical moment before the first moment.

According to a third aspect, an embodiment of this application provides a frequency controller. The frequency controller may include an obtaining unit, a determining unit, and an adjustment unit.

The obtaining unit is configured to obtain at least two temperatures of a processor core, where each of the at least two temperatures corresponds to a frequency.

The determining unit is configured to determine a load change mode of the processor core and determine a target temperature from the at least two temperatures based on the load change mode, where the load change mode is used to indicate a change status of a load of the processor core.

The adjustment unit is configured to adjust a frequency of the processor core based on the target temperature.

In a possible design, the obtaining unit is specifically configured to obtain a temperature of the processor core at a first moment, and then predict a temperature of the processor core at a second moment based on the temperature of the processor core at the first moment. The second moment is later than the first moment.

In a possible design, the determining unit is specifically configured to: if the load change mode of the processor core is a load constant mode, use, as the target temperature, a temperature corresponding to a highest frequency in a frequency corresponding to the temperature at the first moment and a frequency corresponding to the temperature at the second moment; if the load change mode of the processor core is a load increase mode, use the temperature at the first moment as the target temperature; or if the load change mode of the processor core is a load decrease mode, use the temperature at the second moment as the target temperature.

In a possible design, the determining unit may determine the load change mode of the processor core in any one of the following manners:

Manner 1: The determining unit determines a first load change range based on a load of the processor core at a historical moment before the first moment and a preset load change amount. If a load of the processor core at the first moment falls within the first load change range, the determining unit determines that the load change mode of the processor core is the load constant mode. If a load of the processor core at the first moment is larger than a maximum load in the first load change range, the determining unit determines that the load change mode of the processor core is the load increase mode. If a load of the processor core at the first moment is smaller than a minimum load in the first load change range, the determining unit determines that the load change mode of the processor core is the load decrease mode.

Manner 2: The determining unit determines a second load change range based on a load of the processor core at the first moment and a preset load change amount, and then predicts a load of the processor core at the second moment based on the load of the processor core at the first moment and a load of the processor core at a historical moment before the first moment. If the load of the processor core at the second moment falls within the second load change range, the determining unit determines that the load change mode of the processor core is the load constant mode. If the load of the processor core at the second moment is larger than a maximum load in the second load change range, the determining unit determines that the load change mode of the processor core is the load increase mode. If the load of the processor core at the second moment is smaller than a minimum load in the second load change range, the determining unit determines that the load change mode of the processor core is the load decrease mode.

In a possible design, the obtaining unit may predict the temperature of the processor core at the second moment in any one of the following manners:

Manner 1: The obtaining unit predicts the temperature of the processor core at the second moment based on power of the processor core at the first moment and the temperature of the processor core at the first moment.

Manner 2: The obtaining unit predicts the temperature of the processor core at the second moment based on the temperature of the processor core at the first moment and a temperature of the processor core at the historical moment before the first moment.

According to a fourth aspect, this application provides a processor. The processor includes a processor core, a temperature sensor, a frequency adjuster, and a frequency controller, where the temperature sensor and the frequency adjuster are connected to the frequency controller.

The temperature sensor connected to the processor core is configured to obtain at least one first temperature of the processor core and send the at least one first temperature to the frequency controller.

The frequency controller is configured to: determine at least one second temperature of the processor core based on the at least one first temperature of the processor core, determine a load change mode of the processor core, determine a target temperature from the at least one first temperature and the at least one second temperature based on the load change mode of the processor core, and send a frequency corresponding to the target temperature to the frequency adjuster. Each of the at least one first temperature and the at least one second temperature corresponds to a frequency, and the load change mode is used to indicate a change status of a load of the processor core.

The frequency adjuster connected to the processor core is configured to adjust a frequency of the processor core to the frequency corresponding to the target temperature.

In a possible design, the temperature sensor may obtain a first temperature of the processor core at a first moment, and send the first temperature of the processor core at the first moment to the frequency controller. Then, the frequency controller predicts a second temperature of the processor core at a second moment based on the first temperature of the processor core at the first moment. The second moment is later than the first moment.

In a possible design, the frequency controller may determine the target temperature in the following manners: If the load change mode of the processor core is a load constant mode, the frequency controller uses, as the target temperature, a temperature corresponding to a highest frequency in a frequency corresponding to the first temperature at the first moment and a frequency corresponding to the second temperature at the second moment. If the load change mode of the processor core is a load increase mode, the frequency controller uses the first temperature at the first moment as the target temperature. If the load change mode of the processor core is a load decrease mode, the frequency controller uses the second temperature at the second moment as the target temperature.

In a possible design, the frequency controller may determine the load change mode of the processor core in any one of the following manners:

Manner 1: The frequency controller determines a first load change range based on a load of the processor core at a historical moment before the first moment and a preset load change amount. If a load of the processor core at the first moment falls within the first load change range, the frequency controller determines that the load change mode of the processor core is the load constant mode. If a load of the processor core at the first moment is larger than a maximum load in the first load change range, the frequency controller determines that the load change mode of the processor core is the load increase mode. If a load of the processor core at the first moment is smaller than a minimum load in the first load change range, the frequency controller determines that the load change mode of the processor core is the load decrease mode.

Manner 1: The frequency controller determines a second load change range based on a load of the processor core at the first moment and a preset load change amount, and predicts a load of the processor core at the second moment based on the load of the processor core at the first moment and a load of the processor core at a historical moment before the first moment. If the load of the processor core at the second moment falls within the second load change range, the frequency controller determines that the load change mode of the processor core is the load constant mode. If the load of the processor core at the second moment is larger than a maximum load in the second load change range, the frequency controller determines that the load change mode of the processor core is the load increase mode. If the load of the processor core at the second moment is smaller than a minimum load in the second load change range, the frequency controller determines that the load change mode of the processor core is the load decrease mode.

In a possible design, the processor may further include a power sensor, and the power sensor is connected to the processor core. In this case, the power sensor may obtain power of the processor core at the historical moment before the first moment and power of the processor core at the first moment, and send the power at the historical moment and the power at the first moment to the frequency controller. The temperature sensor may further obtain a temperature of the processor core at the historical moment before the first moment, and send the temperature of the processor core at the historical moment before the first moment to the frequency controller. In this way, the frequency controller may determine the load of the processor core at the historical moment based on the power of the processor core at the historical moment and the temperature of the processor core at the historical moment, and determine the load of the processor core at the first moment based on the power of the processor core at the first moment and the first temperature of the processor core at the first moment.

In a possible design, the frequency controller may predict the second temperature of the processor core at the second moment in any one of the following manners:

Manner 1: The frequency controller predicts the second temperature of the processor core at the second moment based on the first temperature of the processor core at the first moment and the power of the processor core at the first moment.

Manner 2: The frequency controller predicts the second temperature of the processor core at the second moment based on the first temperature of the processor core at the first moment and the temperature of the processor core at the historical moment before the first moment.

According to a fifth aspect, this application provides an electronic device, where the electronic device includes the processor according to any one of the fourth aspect.

The foregoing aspects or other aspects of this application are specifically described in the following embodiments.

DESCRIPTION OF EMBODIMENTS

Figure 1:
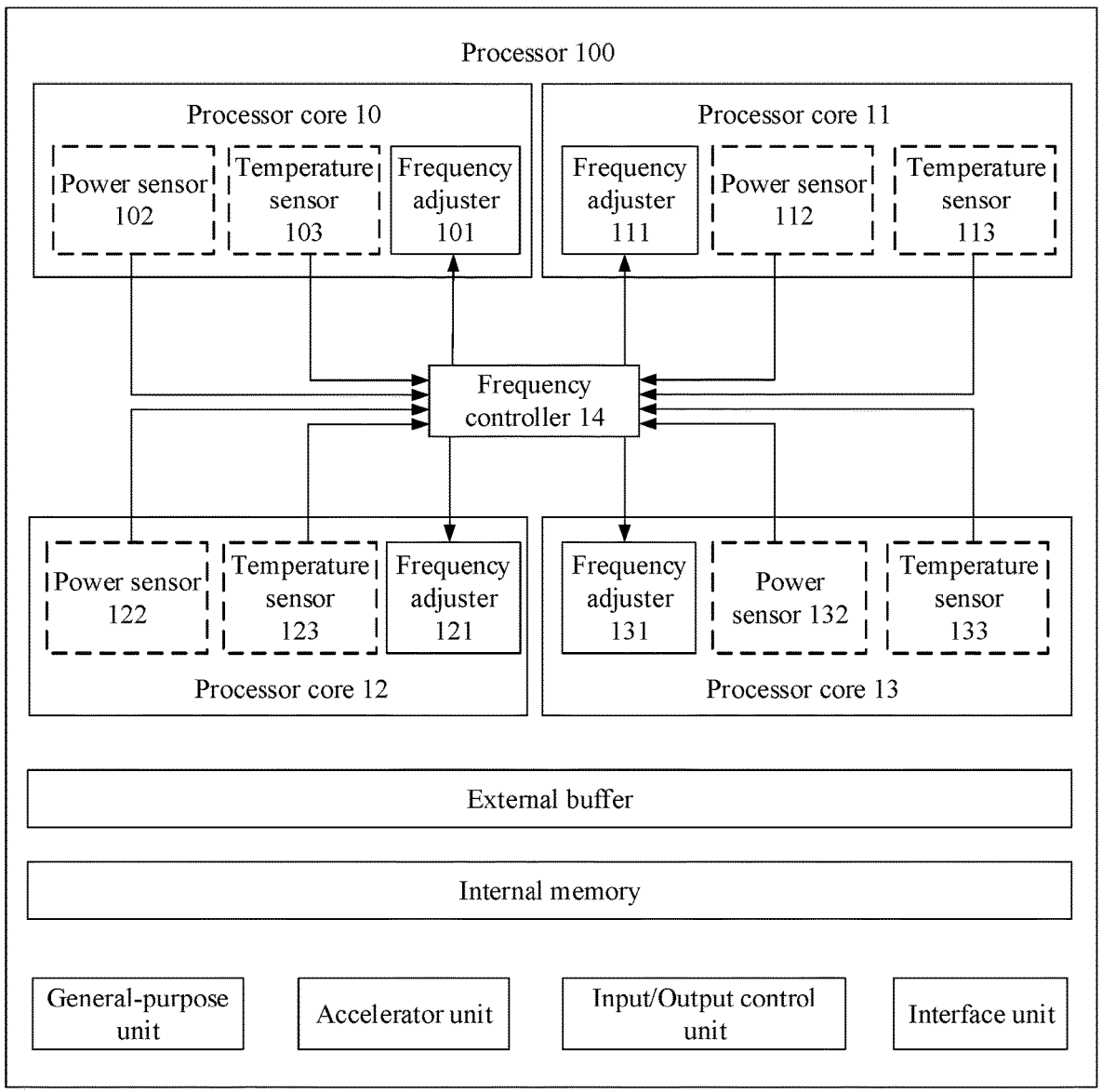
FIG. 1 is an example of a schematic structural diagram of a processor according to an embodiment of this application.

The embodiments disclosed in this application may be applied to an electronic device having a turbo function. In some embodiments of this application, the electronic device may be a computer device having a processor (such as a central processing unit (central processing unit, CPU)), for example, a desktop computer. It should be further understood that, in some other embodiments of this application, the electronic device may alternatively be a portable electronic device having a processor, such as a mobile phone, a tablet, a wearable device (such as a smartwatch) having a wireless communication function, or an in-vehicle device. An example embodiment of the portable electronic device includes but is not limited to a portable electronic device using iOS®, Android®, Microsoft®, or another operating system.

If the electronic device has a turbo function and a power margin of a processor core in the electronic device meets a requirement for enabling the turbo function, the electronic device may increase a frequency of the processor core to operate at a frequency higher than that specified by a manufacturer, so as to improve processing performance of the processor core. However, as a frequency of the processor core increases, power of the processor core increases accordingly, and the increased power is presented in a form of heat energy. As a result, a temperature of the processor core increases. If the processor core cannot be cooled down timely by using a heat dissipation capability of the electronic device, reliability and a service life of the processor core are affected due to an excessively high temperature.

In order to reduce impact of turbo adjustment on the reliability and service life of the processor core, a temperature threshold range is preset in the electronic device in a possible implementation. If a current temperature of the processor core is within the temperature threshold range, the electronic device does not adjust the frequency of the processor core. If the current temperature of the processor core is lower than the temperature threshold range, the electronic device increases the frequency of the processor core to improve processing performance of the processor. If the current temperature of the processor core is higher than the temperature threshold range, the electronic device reduces the frequency of the processor core to reduce the temperature of the processor core. The temperature threshold range may be set based on a rated temperature of the processor core. For example, if the rated temperature is 99° C. (in Celsius), the temperature threshold range may be set to 98° C. to 100° C.

Although the frequency of the processor core can be adjusted based on the current temperature of the processor core in the foregoing implementation, the current temperature of the processor core actually depends on a load of the processor core. A large load of the processor core indicates more operations performed by the processor core. As a result, the temperature of the processor core is higher. A smaller load of the processor core indicates less operations performed by the processor core. As a result, the temperature of the processor core is higher. There is a causal relationship between the load and temperature of the processor core. Therefore, a temperature change of the processor core actually lags behind a load change of the processor core. For example, the current temperature of the processor core may be caused by the load of the processor core at a previous moment, and the current load of the processor core may actually cause the temperature of the processor core to further increase or decrease. If the frequency of the processor core is adjusted merely based on the current temperature of the processor core, the frequency of the processor core may fail to be adjusted in a timely manner due to the hysteresis.

In view of this, this application provides a frequency control method to control the frequency of the processor core in real time based on at least two temperatures and a load of the processor core. In this way, a temperature of the processor core after frequency adjustment can be always within a proper temperature range. This prevents the processor core from being kept in a high-voltage high-frequency state for a long time. In addition, in this method, a target temperature suitable for a current load change mode can be further selected from the at least two temperatures of the processor core to perform frequency adjustment. Therefore, a frequency, obtained after adjustment, of the processor core can better conform to current load change characteristics of the processor core. In this way, the frequency of the processor core can be adjusted more timely.

The following describes the technical solutions in embodiments of the present application with reference to the accompanying drawings in embodiments of the present application. It is clear that the described embodiments are merely a part rather than all of embodiments of the present application.

The terms "system" and "network" may be used interchangeably in embodiments of this application. "At least one" means one or more, and "a plurality of" means two or more. "And/or" describes an association relationship between associated objects, and indicates that three relationships may exist. For example, "A and/or B" may indicate the following cases: Only A exists, both A and B exist, and only B exists, where A and B may be singular or plural. The character "/" usually indicates an "or" relationship between associated objects. At least one of the following items (pieces) or a similar expression thereof refers to any combination of these items, including any combination of singular items (pieces) or plural items (pieces). For example, at least one item (piece) of a, b, or c may indicate: a, b, c, a and b, a and c, b and c, or a, b, and c, where a, b, and c may be singular or plural.

In addition, unless otherwise stated, ordinal numbers such as "first" and "second" in embodiments of this application are for distinguishing between a plurality of objects, but are not intended to limit an order, a time sequence, priorities, or importance of the plurality of objects. For example, a first moment and a second moment are merely used to distinguish between different moments, but do not indicate different priorities, importance, or the like of the two moments.

FIG. 1 is an example of a schematic structural diagram of a processor 100 according to an embodiment of this application. As shown in FIG. 1, the processor 100 may include at least one processor core, for example, a processor core 10, a processor core 11, a processor core 12, and a processor core 13. The processor 100 may further include non-core components, for example, a general-purpose unit (such as a counter, a decoder, a signal generator, or the like), an accelerator unit, an input/output control unit, an interface unit, an internal memory, an external buffer, and the like. Each processor core and each non-core component may be connected by using a communications bus (not shown in FIG. 1), to perform data transmission.

It should be understood that the processor 100 may be a chip. For example, the processor 100 may be a field programmable gate array (field programmable gate array, FPGA), an application-specific integrated circuit (application-specific integrated circuit, ASIC), a system on a chip (system on a chip, SoC), a central processing unit (central processing unit, CPU), a network processor (network processor, NP), a digital signal processing circuit (digital signal processor, DSP), a microcontroller (microcontroller unit, MCU), a programmable logic device (programmable logic device, PLD), or another integrated chip. It should be noted that the processor 100 in this embodiment of this application may alternatively be an integrated circuit chip having a signal processing capability. For example, the processor 100 may be a general-purpose processor, a digital signal processor (DSP), an application-specific integrated circuit (ASIC), a field programmable gate array (FPGA) or another programmable logic device, a discrete gate or a transistor logic device, or a discrete hardware component. The general-purpose processor may be a microprocessor, or the processor may be any conventional processor or the like.

It may be understood that each of the memories (such as the internal memory and the external buffer) in this embodiment of this application may be a volatile memory or a nonvolatile memory, or may include both a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM) and is used as an external cache. By way of example but not restrictive description, RAMS in many forms may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM). It should be noted that the memory in the methods described in this specification includes but is not limited to these memories and any other proper types of memories.

In this embodiment of this application, still referring to FIG. 1, the processor may further include a frequency controller 14, and a frequency adjuster may be further disposed in each processor core. The frequency controller 14 may be communicatively connected to the frequency adjuster in each processor core. In this way, when controlling turbo adjustment for each processor core, the frequency controller 14 may send a frequency control instruction to the frequency adjuster in the processor core. Then, the frequency adjuster in the processor core can adjust a frequency of the processor core based on the frequency control instruction, for example, adjust the frequency to be higher than a maximum frequency set by a manufacturer.

It should be noted that FIG. 1 is merely an example for description. In another possible example, the frequency adjuster may be disposed in only one or more processor cores. In this way, the frequency controller 14 may control only a frequency of a processor core in which the frequency adjuster is disposed. Alternatively, the frequency adjuster may be disposed in the non-core component. In this way, the frequency controller 14 may control not only a frequency of the processor core but also a frequency of the non-core component. Certainly, the non-core component described herein refers to a component that operates at a specified frequency.

The following describes a frequency control method in this application by using an example in which a frequency of one processor core is controlled. Details about controlling a frequency of another processor core or a non-processor core are not described herein.

Figure 2:
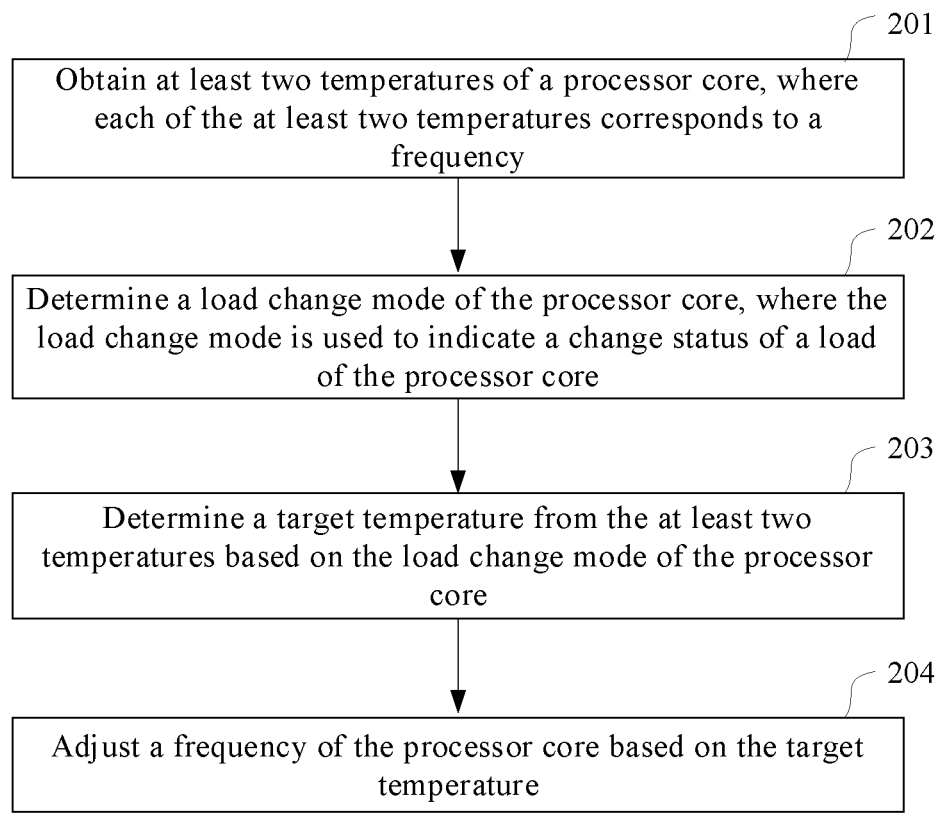
FIG. 2 is an example of a flowchart of a frequency control method according to an embodiment of this application.

On the basis of the processor shown in FIG. 1, FIG. 2 is an example of a flowchart of a frequency control method according to an embodiment of this application. This method applies to a frequency controller, such as the frequency controller 14 shown in FIG. 1. In this embodiment of this application, the frequency controller may perform the frequency control method in a periodic manner. FIG. 2 shows an example of a frequency control process of the frequency controller. Referring to FIG. 2, the method includes the following steps:

Step 201: The frequency controller obtains at least two temperatures of a processor core.

In this embodiment of this application, the at least two temperatures of the processor core may include a current temperature of the processor core, and may further include at least one of a temperature of the processor core at a future moment and a temperature of the processor core at a historical moment. Each temperature may correspond to a frequency, and different temperatures may correspond to different frequencies. How to calculate a frequency corresponding to a temperature is specifically described in Step 204. Details are not described herein.

Step 202: The frequency controller determines a load change mode of the processor core.

In this embodiment of this application, the load change mode of the processor core is used to indicate a change status of a load of the processor core. For example, if a current load of the processor core increases significantly compared with a historical load of the processor core, the load change mode of the processor core is a load increase mode. If the current load of the processor core decreases significantly compared with the historical load of the processor core, the load change mode of the processor core is a load decrease mode. If the current load of the processor core differs slightly from the historical load of the processor core, the load change mode of the processor core is a load constant mode. Data values used for determining that load "increases significantly", "decreases significantly", and "differs slightly" may be set by a person skilled in the art based on experience, or may be set based on actual requirements. This is not specifically limited.

Step 203: The frequency controller determines a target temperature from the at least two temperatures based on the load change mode.

In this embodiment of this application, the target temperature may be a temperature that best matches the load change mode in a plurality of temperatures. For example, the plurality of temperatures include the current temperature and a future temperature, and the load change mode is the load increase mode. In this case, there is actually no need to perform frequency reduction in advance because the current temperature does not increase to the future temperature. Therefore, the current temperature may be used as the target temperature. For another example, the plurality of temperatures include the current temperature and a historical temperature, and the load change mode is the load decrease mode. In this case, the current temperature is lower than the historical temperature. Therefore, the current temperature may also be used as the target temperature to improve processing performance of the processor core. A plurality of policies can be used to determine the target temperature from the at least two temperatures. A specific policy to be used may be determined by a person skilled in the art based on experience, and details are not described herein.

Step 204: The frequency controller adjusts a frequency of the processor core to a frequency corresponding to the target temperature.

In this embodiment of this application, the frequency controller may determine a frequency corresponding to each temperature by using a plurality of methods, such as proportional-integral-derivative (proportion-integral-derivative, PID) control, experimental measurement, and the like. The PID control method logically corresponds to a mathematical expression whose dependent variable is a frequency and independent variables are a temperature and a temperature change amount. Parameters in the mathematical expression may include a proportional parameter, an integral parameter, and a derivative parameter. These parameters are obtained through induction in advance based on an expected temperature through a plurality of experiments. When determining a frequency corresponding to a temperature, the frequency controller directly substitutes, into the foregoing mathematical expression, the temperature and a change amount of the temperature compared with a historical temperature. In this way, the frequency corresponding to the temperature can be obtained through calculation. For the PID control method, if a deviation value between a temperature and the expected temperature is positive, the temperature corresponds to a lower frequency. In this case, the frequency controller can reduce the frequency of the processor core when the temperature is higher than the expected temperature. This reduces heat production of the processor core and allows the temperature of the processor core to be close to the expected temperature to the greatest extent. If a deviation value between a temperature and the expected temperature is negative, the temperature corresponds to a higher frequency. In this case, the frequency controller can increase the frequency of the processor core when the temperature is lower than the expected temperature. This maximizes processing performance of the processor core when the temperature of the processor core does not exceed the expected temperature. For the experimental measurement method, the frequency controller may summarize a correspondence (such as a correspondence table or a correspondence diagram) between a temperature and a frequency in advance through a plurality of experiments. In this way, the frequency controller can directly query the correspondence to obtain the frequency corresponding to the temperature.

In this embodiment of this application, the frequency controller may generate a frequency control instruction based on the frequency corresponding to the target temperature, and send the frequency control instruction to a frequency adjuster of the processor core, so that the frequency adjuster adjusts the frequency of the processor core to the frequency corresponding to the target temperature. When increasing the frequency of the processor core, the frequency adjuster needs to synchronously increase an operating voltage of the processor core so that the operating voltage of the processor core can support high-frequency operations. In this case, the processor core can be in a high-voltage high-frequency state. When reducing the frequency of the processor core, the frequency adjuster may synchronously reduce the operating voltage of the processor core. In this case, the processor core switches from a high-voltage low-frequency state to a low-voltage low-frequency state. This also improves electric energy utilization of the processor core. A specific operating voltage to which the processor core is adjusted may be determined by the frequency adjuster based on a preset correspondence between a frequency and an operating voltage. The preset correspondence may be pre-encapsulated inside the frequency adjuster by a person skilled in the art. A preset correspondence corresponding to each processor core may be the same or different.

In this embodiment of this application, if multiple processor cores are located in a same independent power domain, an operating voltage of the independent power domain is an operating voltage corresponding to a processor core with a highest frequency. In this case, another processor core may be in a high-voltage low-frequency state. As a result, electric energy utilization of the another processor core is low. To resolve this issue, in an optional implementation, each processor core may be located in an independent power domain. In this way, an operating voltage of each processor core can correspond to a frequency of the processor core. This helps improve electric energy utilization of the processor core.

In the foregoing embodiment of this application, the frequency controller controls the frequency of the processor core in real time based on the at least two temperatures and the load of the processor core. In this way, a temperature of the processor core after frequency adjustment can be always within a proper temperature range. This prevents the processor core from being kept in the high-voltage high-frequency state for a long time. In addition, the frequency controller further selects the target temperature suitable for a current load change mode from the at least two temperatures of the processor core to perform frequency adjustment. Therefore, a frequency, obtained after adjustment, of the processor core can better conform to current load change characteristics of the processor core. This method considers not only each temperature of the processor core, but also the load of the processor core. Therefore, the frequency of the processor core can be adjusted more timely.

The following describes the frequency control method in embodiments of this application by using a specific embodiment.

Figure 3:
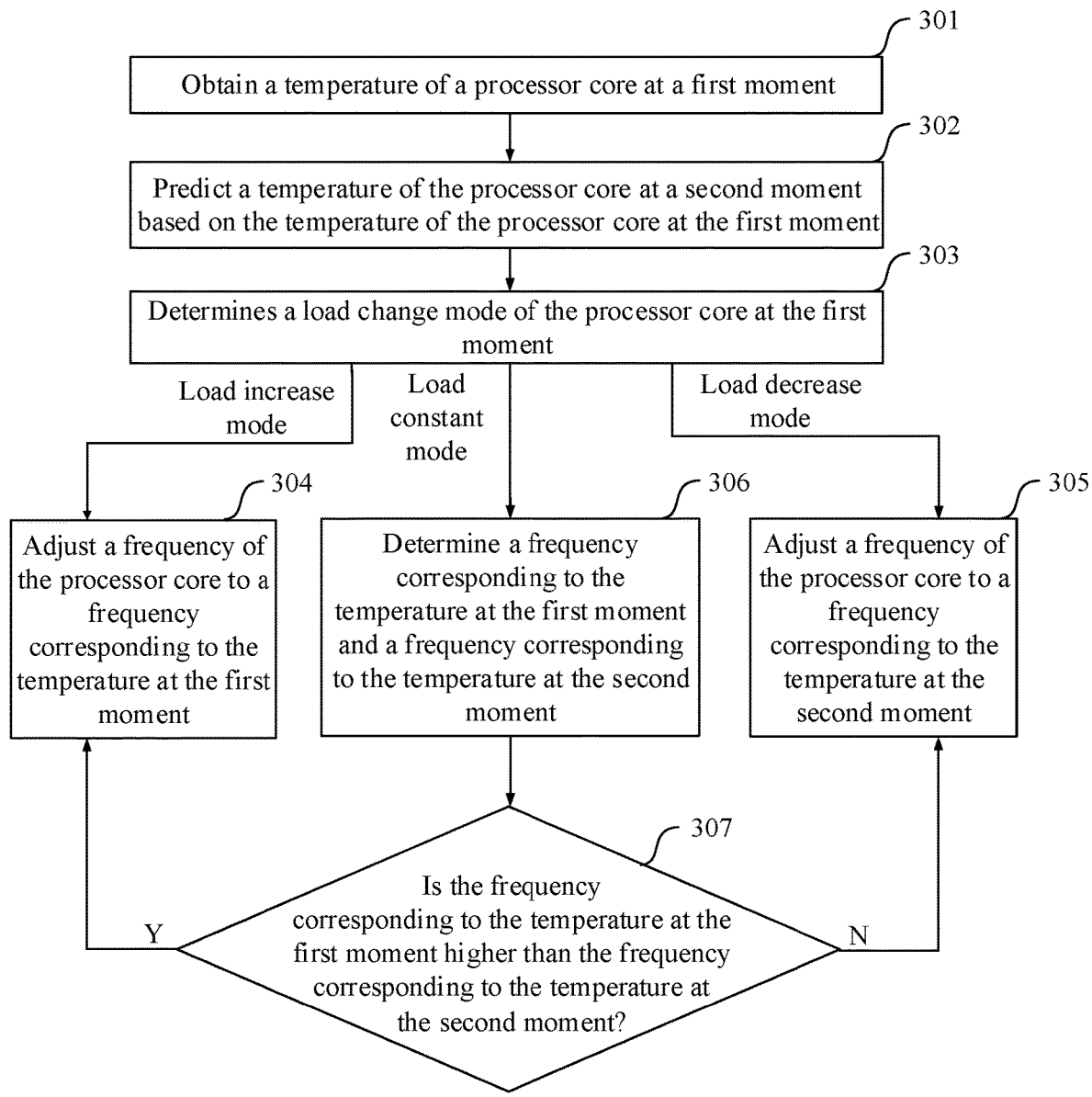
FIG. 3 is an example of a specific flowchart of a frequency control method according to an embodiment of this application.

FIG. 3 is an example of a specific flowchart of a frequency control method according to an embodiment of this application. Referring to FIG. 3, this method applies to a frequency controller, such as the frequency controller 14 shown in FIG. 1. FIG. 3 shows an example of a frequency control process of the frequency controller. Referring to FIG. 3, the method includes the following steps:

Step 301: The frequency controller obtains a temperature of a processor core at a first moment.

In this embodiment of this application, the frequency controller may obtain the temperature of the processor core at the first moment in a plurality of manners. The following describes two optional implementations as examples.

In an optional implementation, referring to FIG. 1, each processor core may further include a temperature sensor, such as a temperature sensor. The temperature sensor is connected to the frequency controller by using a communications line. The temperature sensor may sample a temperature of the processor core based on a first specified period, and send the sampled temperature to the frequency controller by using the communications line between the temperature sensor and the frequency controller. The first specified period may be set by a person skilled in the art based on experience. For example, in order to improve accuracy of temperature sampling, the first specified period may be set to 100 um. In this case, the temperature sensor may sample a temperature of the processor core every 100 um and send the sampled temperature to the frequency controller. In this case, the temperature of the processor core at the first moment may be:

a temperature sampled by the temperature sensor at the first moment, a temperature sampled by the temperature sensor at a latest sampling moment before the first moment, an average value of a temperature sampled by the temperature sensor at the first moment and/or temperatures sampled at multiple sampling moments before the first moment, or a weighted average value of a temperature sampled by the temperature sensor at the first moment and/or temperatures sampled at multiple sampling moments before the first moment.

An example of "a weighted average value of temperatures sampled at multiple sampling moments" is described as follows: The frequency controller performs the frequency control method in this embodiment of this application based on a second specified period of 1 ms, and the first specified period is 100 um. In this case, the frequency controller may receive, in each second specified period, 10 sampled temperatures sent by the temperature sensor. Then, the frequency controller may calculate a weighted average value of the 10 sampled temperatures based on weights preset for the 10 sampled temperatures, and use the weighted average value as the temperature at the first moment. A sum of the weights for the 10 sampled temperatures equals 1, and the weights for the 10 sampled temperatures increase in ascending order in a sampling time sequence.

In this implementation, the frequency controller may directly obtain the temperature at the first moment through measurement. In this case, a temperature sensor needs to be disposed in the processor core. However, the temperature obtained through measurement is relatively accurate, which helps improve accuracy of frequency adjustment.

In another optional implementation, referring to FIG. 1, a power sensor may be further disposed in each processor core. The power sensor is also connected to the frequency controller by using a communications line. The power sensor may sample a quantity of flips of each signal in the processor core based on a third specified period. Then, the power sensor determines power of each signal in the third specified period based on power corresponding to one flip of the signal and the quantity of flips of the signal, calculates total power of the processor core in the third specified period based on the power of each signal in the third specified period, and then sends the total power to the frequency controller by using the communications line between the power sensor and the frequency controller. In this case, the frequency controller may determine, based on a preset correspondence between power and a temperature, a temperature corresponding to the total power, and use the temperature as the temperature of the processor core at the first moment. In this implementation, the frequency controller may obtain the temperature at the first moment through indirect calculation. Indirect calculation has poorer performance than measurement in terms of accuracy. However, in this case, the temperature sensor may not need to be disposed in the processor core. This helps reduce occupied space and design costs of the processor core. It may be understood that "indirectly obtaining the temperature at the first moment by using the power sensor" is merely an optional implementation. In another optional implementation, the frequency controller may obtain the temperature at the first moment in another indirect manner. For example, the frequency controller may predict the temperature at the first moment based on temperatures at historical moments before the first moment. Details are not described herein.

Step 302: A frequency adjuster predicts a temperature of the processor core at a second moment based on the temperature of the processor core at the first moment. The second moment may be any moment later the first moment, for example, a moment 1 ms later the first moment.

In this embodiment of this application, the frequency controller may predict the temperature of the processor core at the second moment in a plurality of manners. The following describes two optional implementations as examples.

In an optional implementation, a temperature sensor is disposed in the processor core. In this case, the frequency controller may first obtain a temperature prediction model through fitting based on the temperature of the processor core at the first moment and a temperature of the processor core at at least one historical moment before the first moment. Then, the frequency controller predicts the temperature of the processor core at the second moment based on the temperature prediction model. In a process of obtaining the temperature prediction model through fitting, any one of a linear model, a quadratic polynomial model, a cubic polynomial model, or a B-spline model may be used as an initial model. An unknown model parameter can be obtained through calculation by substituting, into the initial model, the first moment, the temperature at the first moment, each historical moment before the first moment, and a temperature at each historical moment. Then, the temperature prediction model can be obtained by substituting the unknown model parameter into the initial model.

In another optional implementation, a power sensor is disposed in the processor core. In this case, the frequency controller may first determine power of the processor core at the first moment based on a flip frequency and a flip quantity of each component in the processor core that are sent by the power sensor. Then, the frequency controller calculates the temperature of the processor core at the second moment based on the power of the processor core at the first moment and the temperature of the processor core at the first moment by using the following formula (1.1):

$$T_2 = AT_1 + BP_1 \quad (1.1)$$

$T_2$ represents the temperature of the processor core at the second moment, $T_1$ represents the temperature of the processor core at the first moment, and $P_1$ represents the power of the processor core at the first moment. Coefficients A and B in the formula (1.1) are constants. Values of the coefficients A and B may be calculated through experiments. A larger quantity of experiments indicates more accurate values for the coefficients A and B.

In this implementation, the processor core comprehensively considers current power and a current temperature when predicting a future temperature. The current power can reflect a load status of the processor core. Compared with a future temperature predicted only based on a temperature, the future temperature determined in this implementation can better conform to current load characteristic of the processor core.

In this embodiment of this application, "disposing a temperature sensor or a power sensor in each processor core" is merely an optional implementation. In another optional implementation, a shared temperature sensor or a shared power sensor may be disposed for two or more processor cores. In this case, a temperature sampled by the temperature sensor may be a temperature at a specific point in the two or more processor cores. Therefore, the frequency controller may subsequently compensate, based on a specific policy, the temperature sampled by the temperature sensor, so as to obtain a temperature of each processor core. Alternatively, power sampled by the power sensor is total power of the two or more processor cores. Therefore, the frequency controller may subsequently allocate, based on a specific proportion, the power sampled by the power sensor, so as to obtain power of each processor core. A specific policy or proportion to be used may be determined by a person skilled in the art based on experience, and details are not described herein.

Step 303: The frequency controller determines, based on a load of the processor core at the first moment, a load change mode corresponding to the processor core at the first moment.

If the load change mode corresponding to the first moment is a load increase mode, Step 304 is performed.

If the load change mode corresponding to the first moment is a load decrease mode, Step 305 is performed.

If the load change mode corresponding to the first moment is a load constant mode, Step 306 is performed.

In an optional implementation, a load of the processor core at any moment may be determined based on power, a frequency, and a voltage of the processor core at the moment. An example in which a load at an $i^{th}$ moment is determined is used. A voltage sampler may be further disposed in the processor core, and the voltage sampler may sample a voltage of the processor core at any moment. In this case, the frequency controller may obtain a voltage of the processor core at the $i^{th}$ moment by using the voltage collector, obtain power of the processor core at the $i^{th}$ moment by using the power sensor, and obtain a frequency of the processor core at the $i^{th}$ moment by using the frequency adjuster. Then, the frequency controller calculates the load of the processor core at the $i^{th}$ moment by using the following formula (1.2):

$$A_i = P_i / (f_i \times V_i^2) \qquad (1.2)$$

$A_i$ represents the load of the processor core at the $i^{th}$ moment, $P_i$ represents the power of the processor core at the $i^{th}$ moment, $f_i$ represents the frequency of the processor core at the $i^{th}$ moment, and $V_i$ represents the voltage of the processor core at the $i^{th}$ moment.

In this embodiment of this application, the frequency controller may determine the load change mode corresponding to the processor core at the first moment in a plurality of manners. The following describes two optional implementations as examples.

In an optional implementation, the frequency controller may determine the load change mode corresponding to the processor core at the first moment based on the load of the processor core at the first moment and a load of the processor core at a historical moment before the first moment. Specifically, the frequency controller may first calculate, based on the foregoing formula (1.2), the load $A_1$ ($A_1 = P_1 / (f_1 \times V_1^2)$) of the processor core at the first moment and the load $A_0$ ($A_0 = P_0 / (f_0 \times V_0^2)$) of the processor core at the historical moment before the first moment. Then, the frequency controller determines a first load change range $[(1-x) \times A_0, (1+x) \times A_0]$ based on a preset load change rate (it is assumed that x is a real number greater than 0 but not greater than 1) and the load $A_0$ of the processor core at the historical moment.

In this case, if the load of the processor core at the first moment falls within the first load change range (that is, $(1-x) \times A_0 \leq A_1 \leq (1+x) \times A_0$), the load of the processor core at the first moment differs slightly from the load of the processor core at the historical moment. Therefore, it may be determined that the load change mode corresponding to the processor core at the first moment is the load constant mode.

Alternatively, if the load of the processor core at the first moment is smaller than a minimum load in the first load change range (that is, $A_1 \geq (1-x) \times A_0$), the load of the processor core at the first moment is significantly smaller than the load of the processor core at the historical moment. Therefore, it may be determined that the load change mode corresponding to the processor core at the first moment is the load decrease mode.

Alternatively, if the load of the processor core at the first moment is larger than a maximum load in the first load change range (that is, $A_1 \leq (1+x) \times A_0$), the load of the processor core at the first moment is significantly larger than the load of the processor core at the historical moment. Therefore, it may be determined that the load change mode corresponding to the processor core at the first moment is the load increase mode.

For example, in order to enable the first load change range to accurately reflect a difference between the load of the processor core at the first moment and the load of the processor core at the historical moment, the load change rate may be set to a real number slightly greater than 0, such as 0.1.

In another optional implementation, the frequency controller may alternatively determine the load change mode corresponding to the processor core at the first moment based on the load of the processor core at the first moment and a load of the processor core at a future moment (such as the second moment) later the first moment. Specifically, the frequency controller may first calculate, based on the foregoing formula (1.2), the load $A_1$ ($A_1 = P_1 / (f_1 \times V_1^2)$) of the processor core at the first moment and the load $A_0$ of the processor core at the historical moment before the first moment. Then, the frequency controller obtains a load prediction model through fitting based on the load $A_1$ at the first moment and the load $A_0$ at the historical moment, and predicts the load (assumed to be $A_3$) of the processor core at the future moment based on the load prediction model obtained through fitting. After that, the frequency controller determines a second load change range $[(1-x) \times A_1, (1+x) \times A_1]$ based on the preset load change rate x and the load $A_1$ of the processor core at the first moment.

In this case, if the load of the processor core at the future moment falls within the second load change range (that is, $(1-x) \times A_1 \leq A_3 \leq (1+x) \times A_1$), the load of the processor core at the future moment differs slightly from the load of the processor core at the first moment. Therefore, it may be determined that the load change mode corresponding to the processor core at the first moment is the load constant mode.

Alternatively, if the load of the processor core at the future moment is smaller than a minimum load in the second load change range (that is, $A_3 \geq (1-x) \times A_1$), the load of the processor core at the future moment is significantly smaller than the load of the processor core at the first moment. Therefore, it may be determined that the load change mode corresponding to the processor core at the first moment is the load decrease mode.

Alternatively, if the load of the processor core at the future moment is larger than a maximum load in the second load change range (that is, $A_3 \leq (1+x) \times A_1$), the load of the processor core at the future moment is significantly larger than the load of the processor core at the first moment. Therefore, it may be determined that the load change mode corresponding to the processor core at the first moment is the load increase mode.

Step 304: The frequency controller sends a first frequency control instruction to the frequency adjuster of the processor core. The first frequency control instruction is used by the frequency adjuster of the processor core to adjust a frequency of the processor core to a frequency corresponding to the temperature at the first moment.

For ease of understanding, in the following description, the first moment is referred to as a current moment, and the second moment is referred to as a future moment. To be specific, the "current moment" in the following may be replaced by the "first moment", and the "future moment" in the following may be replaced by the "second moment".

In Step 304, when the load at the current moment is in an increase state, the load at the future moment corresponds to a higher temperature (such as a limit temperature at which frequency reduction is required). However, there is actually no need to perform frequency reduction because the temperature at the current moment does not increase to the temperature at the future moment. In this case, the frequency of the processor core is adjusted based on a frequency corresponding to the temperature at the current moment. This can fully utilize a thermal margin of the processor core, and helps maximize the processing performance of the processor core when the temperature of the processor core is controllable.

Step 305: The frequency controller sends a second frequency control instruction to the frequency adjuster of the processor core. The second frequency control instruction is used by the frequency adjuster of the processor core to adjust a frequency of the processor core to a frequency corresponding to the temperature at the second moment.

In Step 305, when the load at the current moment is in a decrease state, the load at the current moment corresponds to a relatively high temperature, and the load at the future moment corresponds to a relatively low temperature (such as a limit temperature at which a frequency increase is required). In this case, a frequency increasing operation can be performed on the processor core in advance based on the temperature at the future moment. This helps improve the processing performance of the processor core rapidly.

The following describes Steps 304 and 305 of the frequency control method by using a specific embodiment.

Figure 4A:
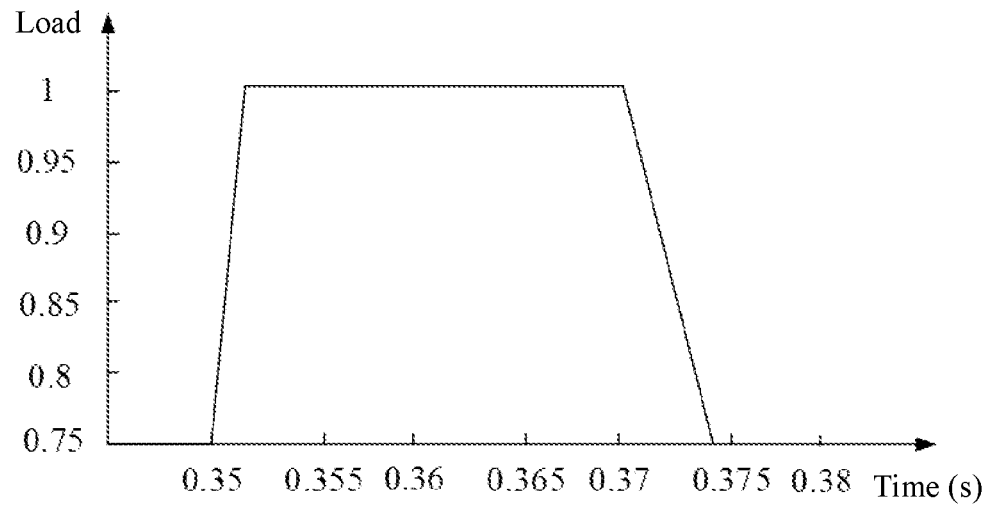
FIG. 4A is an example of a curve chart for a load change of a processor core.
Figure 4B:
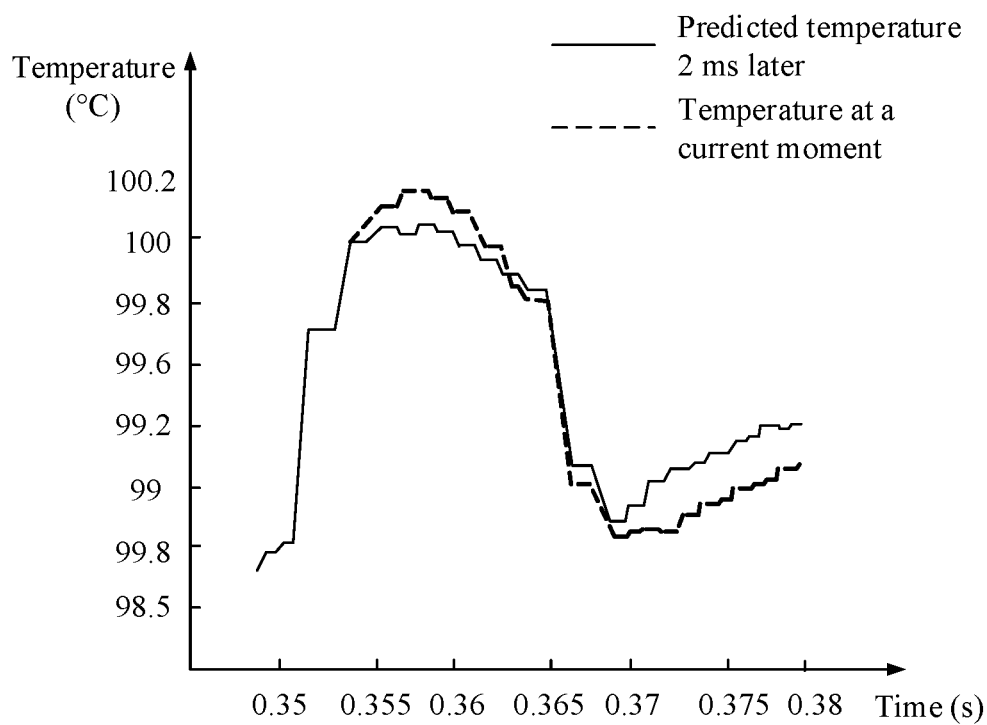
FIG. 4B is an example of a curve chart for a temperature change of a processor core.
Figure 4C:
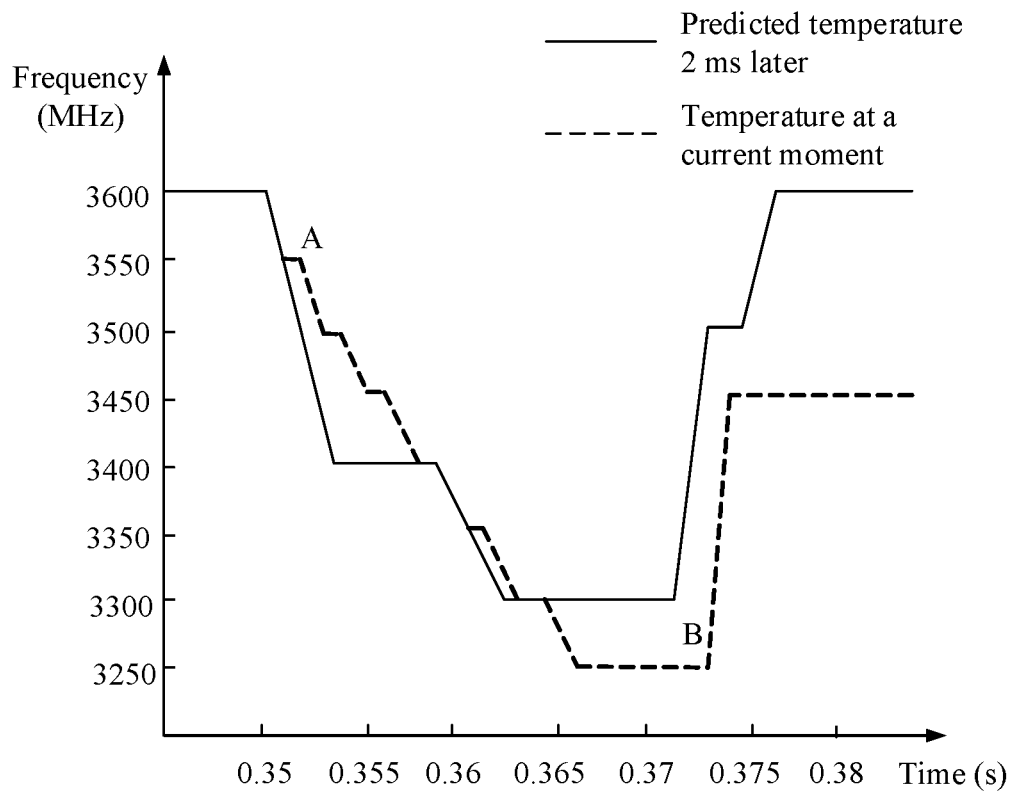
FIG. 4C is an example of a curve chart for a frequency change of a processor core.

FIG. 4A is an example of a curve chart for a load change of the processor core in a time period from 0.35 s to 0.38 s. FIG. 4B is an example of a curve chart for a temperature change of the processor core in the time period from 0.35 s to 0.38 s. FIG. 4C is an example of a curve chart for a frequency change of the processor core in the time period from 0.35 s to 0.38 s. A solid line in FIG. 4B is a temperature change line obtained after frequency adjustment is performed based on a temperature 2 ms later, and a dashed line in FIG. 4B is a temperature change line obtained after frequency adjustment is performed based on the current temperature. A solid line in FIG. 4C is a frequency change line obtained after frequency adjustment is performed based on the temperature 2 ms later, and a dashed line in FIG. 4C is a frequency change line obtained after frequency adjustment is performed based on the current temperature. In this example, it is assumed that a temperature threshold range is from 98.8° C. to 100° C., and there is a correspondence between a temperature and a frequency of the processor core. If the temperature of the processor core is lower than 98.8° C., the current temperature of the processor core is relatively low, and there is a thermal margin in the processor core. In this case, the frequency of the processor core may be increased to make full use of the thermal margin and improve the processing performance of the processor core. Therefore, 98.8° C. can be regarded as the limit temperature at which the frequency of the processor core needs to be increased. If the temperature of the processor core is higher than 100° C., the processor core is at an excessively high frequency. This causes the processor core to be kept in a high-voltage high-frequency state for a long time. In this case, the frequency of the processor core needs to be reduced so that the processor core can have higher availability and a longer service life. Therefore, 100° C. can be regarded as the limit temperature at which the frequency of the processor core needs to be reduced. Referring to FIG. 4A to FIG. 4C, the following information can be learned:

The load of the processor core increases about a time period from 0.35 s to 0.355 s. In this case, if frequency adjustment is performed based on a predicted temperature 2 ms later, the frequency controller may perform frequency reduction (referring to the solid line at a point A in FIG. 4C) in advance because it is predicted that, as the load increases, the temperature of the processor core increases to the limit temperature 100° C. at which frequency reduction is required. However, in this case, the temperature of the processor core actually does not increase to the limit temperature 100° C. at which frequency reduction is required. Therefore, frequency adjustment based on the predicted temperature 2 ms later is over-adjustment. Therefore, in Step 304, frequency adjustment is performed based on the current temperature when the load increases. In this way, the frequency reduction (referring to the dashed line at a point A in FIG. 4C) of the processor core can be deferred to the greatest extent before the limit temperature at which frequency reduction is required is reached in the processor core. This fully utilizes the thermal margin and maximizes the processing performance of the processor core.

The load of the processor core decreases about a time period from 0.37 s to 0.375 s. In this case, if frequency adjustment is performed based on a predicted temperature 2 ms later, the frequency controller may increase (referring to the solid line at a point B in FIG. 4C) the frequency of the processor core in advance because it is predicted that, as the load decreases, the temperature of the processor core decreases to the limit temperature 98.8° C. at which a frequency increase is required. Therefore, in Step 305, frequency adjustment is performed based on the predicted temperature when the load decreases. In this way, a frequency increasing operation can be performed timely when the temperature of the processor core is about to decrease to the limit temperature at which a frequency increase is required. This can not only improve the processing performance of the processor core, but also enables the frequency of the processor core to change with the load more timely.

Step 306: The frequency controller determines a frequency corresponding to the temperature of the processor core at the first moment and a frequency corresponding to the temperature of the processor core at the second moment.

In an optional implementation, the frequency controller may determine the frequency corresponding to the current moment and the frequency corresponding to the future moment by using the PID control method. When determining the frequency corresponding to the current moment by using the PID control method, the frequency controller may first determine a temperature change amount at the current moment based on the temperature at the current moment and a temperature at a latest historical moment, and then substitute the temperature at the current moment and the temperature change amount at the current moment into a relational expression corresponding to the PID control method to calculate the frequency corresponding to the current moment. When determining the frequency corresponding to the future moment by using the PID control method, the frequency controller may first determine a temperature change amount at the future moment based on a predicted future temperature and a previously predicted temperature at the current moment, and then substitute the future temperature and the temperature change amount at the future moment into the relational expression corresponding to the PID control method to calculate the frequency corresponding to the future moment.

For specific implementation of the PID control method, refer to Step 204. Details are not described herein.

Step 307: The frequency controller determines whether the frequency corresponding to the temperature of the processor core at the first moment is higher than the frequency corresponding to the temperature of the processor core at the second moment. If the frequency corresponding to the temperature of the processor core at the first moment is higher than the frequency corresponding to the temperature of the processor core at the second moment, Step 304 is performed. If the frequency corresponding to the temperature of the processor core at the first moment is not higher than the frequency corresponding to the temperature of the processor core at the second moment, Step 305 is performed.

In this embodiment of this application, if a load change of the processor core is relatively small, the processor core is actually in a stable state. In this case, a temperature of the processor core after frequency adjustment does not exceed the temperature threshold range, regardless of whether the frequency of the processor core is adjusted based on the current temperature of the processor core or based on the future temperature of the processor core. On this basis, in this implementation, the frequency of the processor core is adjusted to a higher frequency in the frequency corresponding to the future temperature and the frequency corresponding to the current temperature. This enables the processor core to run at a higher frequency when the temperature of the processor core does not exceed the temperature threshold range, so as to maximize a processing capability of the processor core and fully utilize the thermal margin.

The following describes Step 307 of the frequency control method by using a specific embodiment.

Figure 5A:
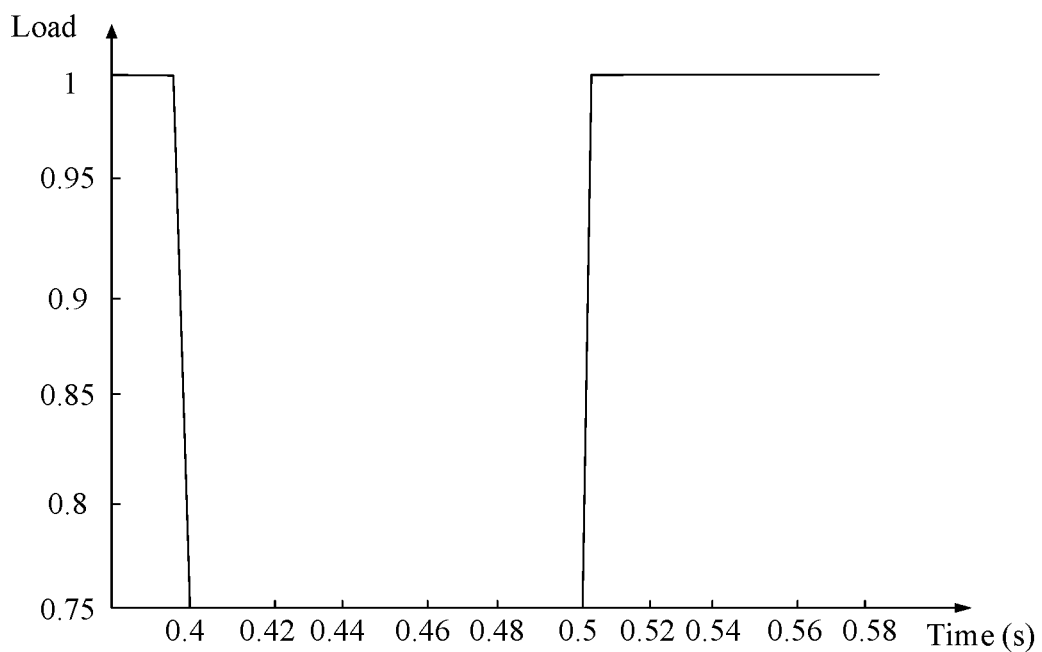
FIG. 5A is an example of another curve chart for a load change of a processor core.
Figure 5B:
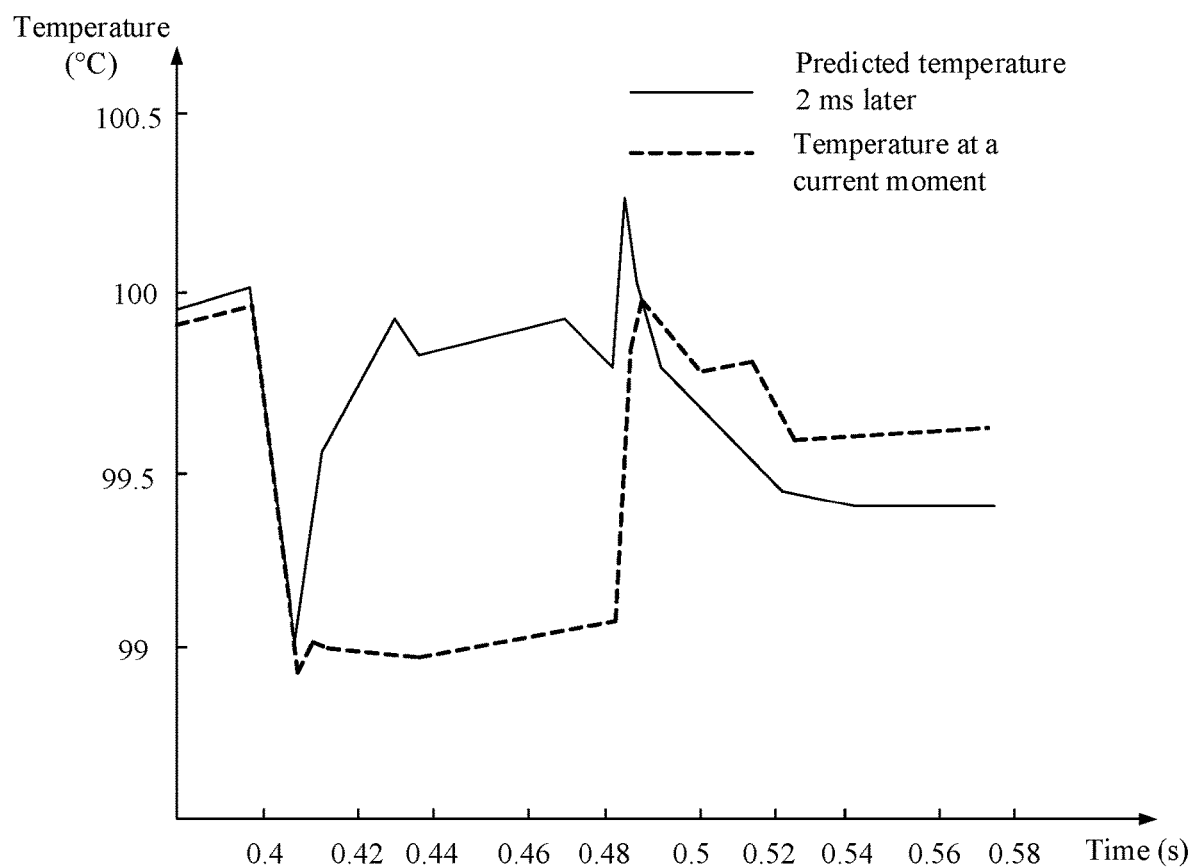
FIG. 5B is an example of another curve chart for a temperature change of a processor core.
Figure 5C:
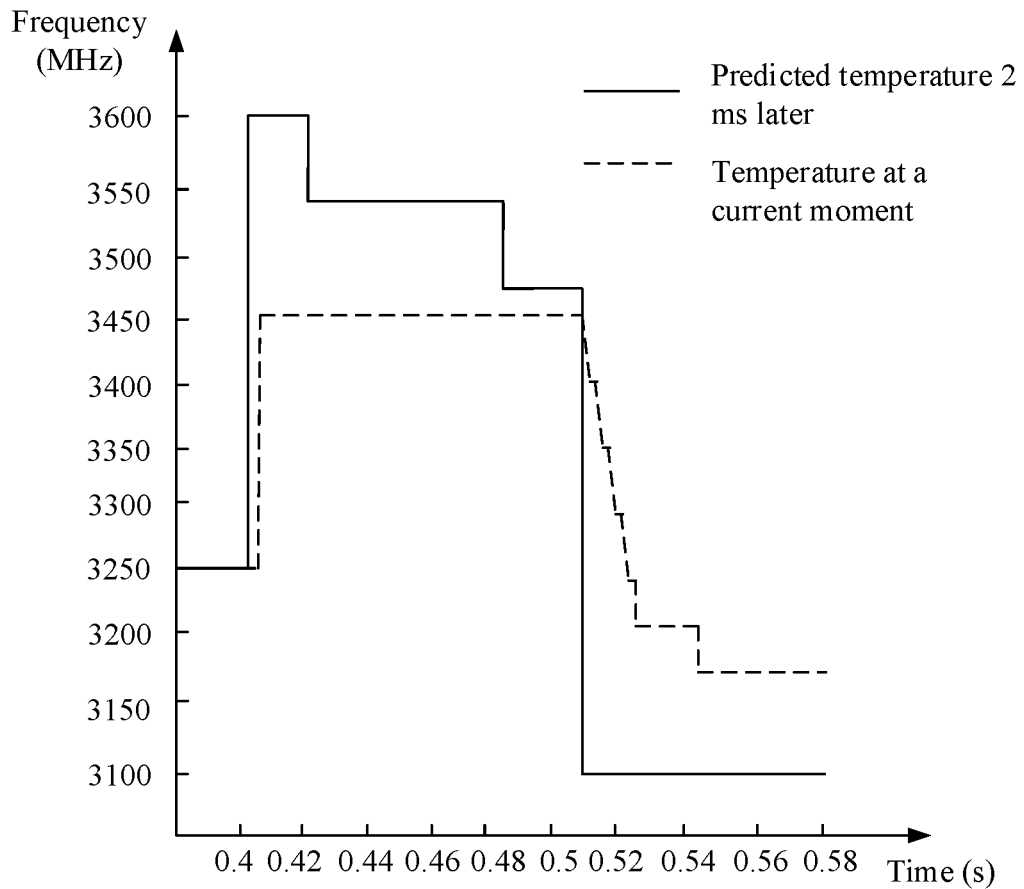
FIG. 5C is an example of another curve chart for a frequency change of a processor core.

FIG. 5A is an example of a curve chart for a load change of the processor core in a time period from 0.4 s to 0.58 s. FIG. 5B is an example of a curve chart for a temperature change of the processor core in the time period from 0.4 s to 0.58 s. FIG. 5C is an example of a curve chart for a frequency change of the processor core in the time period from 0.4 s to 0.58 s. A solid line in FIG. 5B is a temperature change line obtained after frequency adjustment is performed based on a temperature 2 ms later, and a dashed line in FIG. 5B is a temperature change line obtained after frequency adjustment is performed based on the current temperature. A solid line in FIG. 5C is a frequency change line obtained after frequency adjustment is performed based on the temperature 2 ms later, and a dashed line in FIG. 5C is a frequency change line obtained after frequency adjustment is performed based on the current temperature. In this example, it is assumed that the temperature threshold range is from 98.8° C. to 100° C., where 98.8° C. is the limit temperature at which the frequency of the processor core needs to be increased, and 100° C. is a limit temperature at which the frequency of the processor core needs to be reduced. Referring to FIG. 5A to FIG. 5C, the following information can be learned:

In a time period from 0.4 s to 0.5 s and a time period from 0.5 s to 0.58 s, the load of the processor core remains unchanged. In this case, the temperature of the processor core can fall within the temperature threshold range from 98.8° C. to 100° C., regardless of whether frequency adjustment is performed based on a predicted temperature 2 ms later or based on the temperature at the current moment. However, the frequency of the processor core varies when frequency adjustment is performed based on different temperatures.

In the time period from 0.4 s to 0.5 s, compared with frequency adjustment performed based on the temperature at the current moment, frequency adjustment performed based on the predicted temperature 2 ms later may enable the processor core to run at a higher frequency. Therefore, in the time period from 0.4 s to 0.5 s, frequency adjustment may be performed on the processor core based on the predicted temperature 2 ms later.

In the time period from 0.5 s to 0.58 s, compared with frequency adjustment performed based on the predicted temperature 2 ms later, frequency adjustment performed based on the temperature at the current moment may enable the processor core to run at a higher frequency. Therefore, in the time period from 0.5 s to 0.58 s, frequency adjustment may be performed on the processor core based on the temperature at the current moment.

Figure 6:
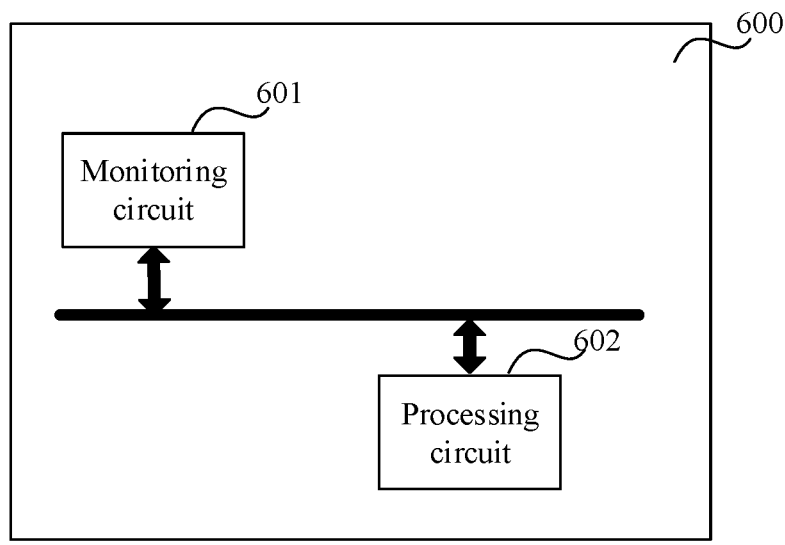
FIG. 6 is an example of a schematic structural diagram of a frequency controller according to an embodiment of this application.

On the basis of the foregoing method, FIG. 6 is a schematic structural diagram of a frequency controller 600 according to an embodiment of this application. The frequency controller 600 may be a chip or circuit, for example, a chip or circuit that may be disposed in a processor. The frequency controller 600 may correspond to the frequency controller 104 in the foregoing method. The frequency controller 600 may perform any one or more steps corresponding to the methods shown in FIG. 2 and FIG. 3. As shown in FIG. 6, the frequency controller 600 may include a monitoring circuit 601 and a processing circuit 602. Further, the frequency controller 600 may include a bus system, where the monitoring circuit 601 and the processing circuit 602 may be connected by using the bus system. In addition, the monitoring circuit 601 may further be connected to a temperature sensor and/or a power sensor of each processor core by using the bus system. The processing circuit 602 may further be connected to a frequency adjuster of each processor core by using the bus system.

In this embodiment of this application, the monitoring circuit 601 may obtain at least two temperatures of each processor core by using the temperature sensor and/or the power sensor of each processor core, and send the at least two temperatures to the processing circuit 602. Correspondingly, the processing circuit 602 may determine a load change mode of each processor core based on the power sensor of the processor core, determine a target temperature from the at least two temperatures of the processor core based on the load change mode, and adjust the frequency of the processor core based on the target temperature. Each of the at least two temperatures may correspond to a frequency, and the load change mode of each processor core may be used to indicate a change status of a load of the processor core.

For a concept, an explanation, a detailed description, and other steps with respect to the frequency controller 600 that are related to the technical solutions provided in embodiments of this application, refer to descriptions of the content in the foregoing methods or another embodiment. Details are not described herein.

Figure 7:
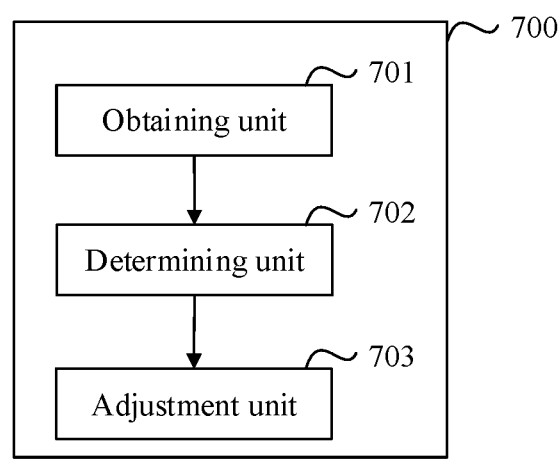
FIG. 7 is an example of a schematic structural diagram of another frequency controller according to an embodiment of this application.

On the basis of the foregoing method, FIG. 7 is a schematic structural diagram of another frequency controller 700 according to an embodiment of this application. The frequency controller 700 may be a chip or circuit, for example, a chip or circuit that may be disposed in a processor. The frequency controller 700 may correspond to the frequency controller 104 in the foregoing method. The frequency controller 700 may perform any one or more steps corresponding to the methods shown in FIG. 2 and FIG. 3. As shown in FIG. 7, the frequency controller 700 may include an obtaining unit 701, a determining unit 702, and an adjustment unit 703.

In this embodiment of this application, the obtaining unit 701 may be a receiving unit or a receiver when receiving information, and the receiving unit or the receiver may be a radio frequency circuit. In specific implementation, the obtaining unit 701 may obtain at least two temperatures of each processor core. The determining unit 702 may determine a load change mode of the processor core, and then determine a target temperature from the at least two temperatures of the processor core based on a load change mode. The adjustment unit 703 may adjust a frequency of the processor core based on the target temperature. Each of the at least two temperatures may correspond to a frequency, and the load change mode of each processor core may be used to indicate a change status of a load of the processor core.

For a concept, an explanation, a detailed description, and other steps with respect to the frequency controller 700 that are related to the technical solutions provided in embodiments of this application, refer to descriptions of the content in the foregoing methods or another embodiment. Details are not described herein.

It may be understood that, for a function of each unit in the foregoing frequency controller 700, reference may be made to implementation of a corresponding method embodiment. Details are not described herein.

It should be understood that the foregoing unit division of the frequency controller 700 is merely logical function division. In actual implementation, all or some of the units may be integrated into one physical entity, or may be physically separated. In this embodiment of this application, the obtaining unit 701 may be implemented by the monitoring circuit 601 in FIG. 6, and the determining unit 702 and the adjustment unit 703 may be implemented by the processing circuit 602 in FIG. 6.

According to the method provided in embodiments of this application, this application further provides a computer program product. The computer program product includes computer program code. When the computer program code is run on a computer, the computer is enabled to perform the method in any one of the embodiments shown in FIG. 1 to FIG. 5.

According to the method provided in embodiments of this application, this application further provides a computer-readable storage medium. The computer-readable storage medium stores program code. When the program code is run on a computer, the computer is enabled to perform the method in any one of the embodiments shown in FIG. 1 to FIG. 5.

Terms such as "component", "module", and "system" used in this specification are used to indicate a computer-related entity, hardware, firmware, a combination of hardware and software, software, or software being executed. For example, a component may be, but is not limited to, a process that is run on a processor, a processor, an object, an executable file, a thread of execution, a program, and/or a computer. As illustrated by using figures, both a computing device and an application that is run on the computing device may be components. One or more components may reside within a process and/or a thread of execution, and a component may be located on one computer and/or distributed between two or more computers. In addition, these components may be executed by various computer-readable media that store various data structures. The components may communicate by using a local and/or remote process and based on, for example, a signal having one or more data packets (for example, data from two components interacting with another component in a local system, in a distributed system, and/or across a network such as the Internet interacting with other systems by using the signal).

A person of ordinary skill in the art may be aware that, the illustrative logical blocks (illustrative logical block) and steps (step) described in embodiments disclosed in this specification may be implemented by electronic hardware or a combination of computer software and electronic hardware. Whether the functions are implemented by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein.

In several embodiments provided in this application, it should be understood that the disclosed system, apparatus, and method may be implemented in another manner. For example, the described apparatus embodiments are merely examples. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in embodiments of this application. The foregoing storage medium includes any medium that can store program code, such as a USB flash drive, a removable hard disk, a read-only memory (read-only memory, ROM), a random access memory (random access memory, RAM), a magnetic disk, an optical disc, or the like.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A frequency control method, comprising:
   obtaining at least two temperatures of a processor core, wherein each of the at least two temperatures corresponds to a frequency;
   determining a load change mode of the processor core, wherein the load change mode is used to indicate a change status of a load of the processor core;
   determining a target temperature from the at least two temperatures based on the load change mode; and
   adjusting a frequency of the processor core based on the target temperature.

2. The frequency control method according to claim 1, wherein the obtaining at least two temperatures of a processor core comprises:
   obtaining a temperature of the processor core at a first moment; and
   predicting a temperature of the processor core at a second moment based on the temperature of the processor core at the first moment, wherein the second moment is later than the first moment.

3. The frequency control method according to claim 2, wherein the determining a target temperature from the at least two temperatures based on the load change mode comprises:
   in response to determining that the load change mode of the processor core is a load constant mode, using, as the target temperature, a temperature corresponding to a highest frequency in a frequency corresponding to the temperature at the first moment and a frequency corresponding to the temperature at the second moment;
   in response to determining that the load change mode of the processor core is a load increase mode, using the temperature at the first moment as the target temperature; or
   in response to determining that the load change mode of the processor core is a load decrease mode, using the temperature at the second moment as the target temperature.

4. The frequency control method according to claim 3, wherein determining the load change mode of the processor core comprises:
   determining a first load change range based on a load of the processor core at a historical moment before the first moment and a preset load change amount; and
   in response to determining that a load of the processor core at the first moment falls within the first load change range, determining that the load change mode of the processor core is the load constant mode;
   in response to determining that a load of the processor core at the first moment is larger than a maximum load in the first load change range, determining that the load change mode of the processor core is the load increase mode; or
   in response to determining that a load of the processor core at the first moment is smaller than a minimum load in the first load change range, determining that the load change mode of the processor core is the load decrease mode.

5. The frequency control method according to claim 3, wherein determining the load change mode of the processor core comprises:
   determining a second load change range based on a load of the processor core at the first moment and a preset load change amount;
   predicting a load of the processor core at the second moment based on the load of the processor core at the first moment and a load of the processor core at a historical moment before the first moment; and
   in response to determining that the load of the processor core at the second moment falls within the second load change range, determining that the load change mode of the processor core is the load constant mode;
   in response to determining that the load of the processor core at the second moment is larger than a maximum load in the second load change range, determining that the load change mode of the processor core is the load increase mode; or
   in response to determining that the load of the processor core at the second moment is smaller than a minimum load in the second load change range, determining that the load change mode of the processor core is the load decrease mode.

6. The frequency control method according to claim 2, wherein the predicting a temperature of the processor core at a second moment based on the temperature of the processor core at the first moment comprises:
   predicting the temperature of the processor core at the second moment based on power of the processor core at the first moment and the temperature of the processor core at the first moment; or
   predicting the temperature of the processor core at the second moment based on the temperature of the processor core at the first moment and a temperature of the processor core at an historical moment before the first moment.

7. A frequency controller, comprising:
   a monitoring circuit; and
   a processing circuit, wherein the monitoring circuit is configured to perform first operations comprising:
      obtaining at least two temperatures of a processor core; and
      sending the at least two temperatures to the processing circuit, wherein each of the at least two temperatures corresponds to a frequency; and
   the processing circuit is configured to perform second operations comprising:
      determining a load change mode of the processor core;
      determining a target temperature from the at least two temperatures based on the load change mode; and
      adjusting a frequency of the processor core based on the target temperature, wherein the load change mode is used to indicate a change status of a load of the processor core.

8. The frequency controller according to claim 7, wherein obtaining the at least two temperatures of the processor core comprises:
   obtaining a temperature of the processor core at a first moment; and
   predicting a temperature of the processor core at a second moment based on the temperature of the processor core at the first moment, wherein the second moment is later than the first moment.

9. The frequency controller according to claim 8, wherein determining the target temperature from the at least two temperatures based on the load change mode comprises:
   in response to determining that the load change mode of the processor core is a load constant mode, using, as the target temperature, a temperature corresponding to a highest frequency in a frequency corresponding to the temperature at the first moment and a frequency corresponding to the temperature at the second moment;

in response to determining that the load change mode of the processor core is a load increase mode, using the temperature at the first moment as the target temperature; or in response to determining that the load change mode of the processor core is a load decrease mode, using the temperature at the second moment as the target temperature.

10. The frequency controller according to claim 9, wherein determining the load change mode of the processor core comprises:

determining a first load change range based on a load of the processor core at a historical moment before the first moment and a preset load change amount;

in response to determining that a load of the processor core at the first moment falls within the first load change range, determining that the load change mode of the processor core is the load constant mode;

in response to determining that a load of the processor core at the first moment is larger than a maximum load in the first load change range, determining that the load change mode of the processor core is the load increase mode; or in response to determining that a load of the processor core at the first moment is smaller than a minimum load in the first load change range, determining that the load change mode of the processor core is the load decrease mode.

11. The frequency controller according to claim 9, wherein determining the load change mode of the processor core comprises:

determining a second load change range based on a load of the processor core at the first moment and a preset load change amount;

predicting a load of the processor core at the second moment based on the load of the processor core at the first moment and a load of the processor core at a historical moment before the first moment; and in response to determining that the load of the processor core at the second moment falls within the second load change range, determining that the load change mode of the processor core is the load constant mode;

in response to determining that the load of the processor core at the second moment is larger than a maximum load in the second load change range, determining that the load change mode of the processor core is the load increase mode; or in response to determining that the load of the processor core at the second moment is smaller than a minimum load in the second load change range, determining that the load change mode of the processor core is the load decrease mode.

12. The frequency controller according to claim 8, predicting the temperature of the processor core at the second moment based on the temperature of the processor core at the first moment comprises:

predicting the temperature of the processor core at the second moment based on power of the processor core at the first moment and the temperature of the processor core at the first moment; or predicting the temperature of the processor core at the second moment based on the temperature of the processor core at the first moment and a temperature of the processor core at a historical moment before the first moment.

13. A processor, comprising a processor core, a temperature sensor, a frequency adjuster, and a frequency controller, wherein:

the temperature sensor and the frequency adjuster are connected to the frequency controller;

the temperature sensor is connected to the processor core and is configured to perform first operations comprising:

obtaining at least one first temperature of the processor core; and sending the at least one first temperature to the frequency controller;

the frequency controller is configured to perform second operations comprising:

determining at least one second temperature of the processor core based on the at least one first temperature of the processor core;

determining a load change mode of the processor core;

determining a target temperature from the at least one first temperature and the at least one second temperature based on the load change mode of the processor core; and sending a frequency corresponding to the target temperature to the frequency adjuster, wherein each of the at least one first temperature and the at least one second temperature corresponds to a frequency, and the load change mode is used to indicate a change status of a load of the processor core; and the frequency adjuster is connected to the processor core and is configured to perform third operations comprising:

adjusting a frequency of the processor core to the frequency corresponding to the target temperature.

14. The processor according to claim 13, wherein obtaining the at least one first temperature of the processor core and sending the at least one first temperature to the frequency controller comprises:

obtaining a first temperature of the processor core at a first moment; and sending the first temperature of the processor core at the first moment to the frequency controller; and determining the at least one second temperature of the processor core based on the at least one first temperature of the processor core comprises:

predicting a second temperature of the processor core at a second moment based on the first temperature of the processor core at the first moment, wherein the second moment is later than the first moment.

15. The processor according to claim 14, wherein determining the target temperature from the at least one first temperature and the at least one second temperature based on the load change mode of the processor core comprises:

in response to determining that the load change mode of the processor core is a load constant mode, using, as the target temperature, a temperature corresponding to a highest frequency in a frequency corresponding to the first temperature at the first moment and a frequency corresponding to the second temperature at the second moment;

in response to determining that the load change mode of the processor core is a load increase mode, using the first temperature at the first moment as the target temperature; or in response to determining that the load change mode of the processor core is a load decrease mode, using the second temperature at the second moment as the target temperature.

16. The processor according to claim 15, wherein determining the load change mode of the processor core comprises:
  determining a first load change range based on a load of the processor core at a historical moment before the first moment and a preset load change amount; and
  in response to determining that a load of the processor core at the first moment falls within the first load change range, determining that the load change mode of the processor core is the load constant mode;
  in response to determining that a load of the processor core at the first moment is larger than a maximum load in the first load change range, determining that the load change mode of the processor core is the load increase mode; or
  in response to determining that a load of the processor core at the first moment is smaller than a minimum load in the first load change range, determining that the load change mode of the processor core is the load decrease mode.

17. The processor according to claim 15, wherein determining the load change mode of the processor core comprises:
  determining a second load change range based on a load of the processor core at the first moment and a preset load change amount;
  predicting a load of the processor core at the second moment based on the load of the processor core at the first moment and a load of the processor core at a historical moment before the first moment; and
  in response to determining that the load of the processor core at the second moment falls within the second load change range, determining that the load change mode of the processor core is the load constant mode;
  in response to determining that the load of the processor core at the second moment is larger than a maximum load in the second load change range, determining that the load change mode of the processor core is the load increase mode; or
  in response to determining that the load of the processor core at the second moment is smaller than a minimum load in the second load change range, determining that the load change mode of the processor core is the load decrease mode.

18. The processor according to claim 16, wherein;
  the processor further comprises a power sensor, and the power sensor is connected to the processor core;
  the power sensor is configured to:
    obtain power of the processor core at the historical moment before the first moment and power of the processor core at the first moment; and
    send the power at the historical moment and the power at the first moment to the frequency controller;
  the temperature sensor is further configured to:
    obtain a temperature of the processor core at the historical moment before the first moment; and
    send the temperature of the processor core at the historical moment before the first moment to the frequency controller; and
  the frequency controller is further configured to:
    determine the load of the processor core at the historical moment based on the power of the processor core at the historical moment and the temperature of the processor core at the historical moment; and
    determine the load of the processor core at the first moment based on the power of the processor core at the first moment and the first temperature of the processor core at the first moment.

19. The processor according to claim 14, wherein predicting a second temperature of the processor core at a second moment based on the first temperature of the processor core at the first moment comprises:
  predicting the second temperature of the processor core at the second moment based on the first temperature of the processor core at the first moment and power of the processor core at the first moment; or
  predicting the second temperature of the processor core at the second moment based on the first temperature of the processor core at the first moment and a temperature of the processor core at a historical moment before the first moment.

20. An electronic device, comprising a processor, wherein the processor comprises a processor core, a temperature sensor, a frequency adjuster, and a frequency controller, and wherein:
  the temperature sensor and the frequency adjuster are connected to the frequency controller;
  the temperature sensor is connected to the processor core and is configured to obtain at least one first temperature of the processor core and send the at least one first temperature to the frequency controller;
  the frequency controller is configured to:
    determine at least one second temperature of the processor core based on the at least one first temperature of the processor core;
    determine a load change mode of the processor core;
    determine a target temperature from the at least one first temperature and the at least one second temperature based on the load change mode of the processor core; and
    send a frequency corresponding to the target temperature to the frequency adjuster, wherein each of the at least one first temperature and the at least one second temperature corresponds to a frequency, and the load change mode is used to indicate a change status of a load of the processor core; and
  the frequency adjuster is connected to the processor core and is configured to adjust a frequency of the processor core to the frequency corresponding to the target temperature.

* * * * *

UNITED STATES PATENT AND TRADEMARK OFFICE
CERTIFICATE OF CORRECTION

PATENT NO. : 12,099,390 B2
APPLICATION NO. : 18/171825
DATED : September 24, 2024
INVENTOR(S) : Di Hu et al.

Page 1 of 1

It is certified that error appears in the above-identified patent and that said Letters Patent is hereby corrected as shown below:

In the Specification

In Column 1, In Line 8, Delete "PCT/CN 2020/110602," and insert -- PCT/CN2020/110602, --.

In the Claims

In Column 29, In Line 45, In Claim 18, delete "wherein;" and insert -- wherein: --.

Signed and Sealed this
Seventeenth Day of December, 2024

Derrick Brent
*Acting Director of the United States Patent and Trademark Office*